(12) United States Patent
Healey et al.

(10) Patent No.: US 10,484,427 B2
(45) Date of Patent: Nov. 19, 2019

(54) METHODS AND SYSTEMS FOR PROVIDING CONFIGURATION MANAGEMENT FOR COMPUTING ENVIRONMENTS

(71) Applicant: Stripe Inc., San Francisco, CA (US)

(72) Inventors: Richard Healey, San Francisco, CA (US); Andrew Brody, Washington, DC (US)

(73) Assignee: STRIPE INC., San Francisco, CA (US)

( * ) Notice: Subject to any disclaimer, the term of this patent is extended or adjusted under 35 U.S.C. 154(b) by 389 days.

(21) Appl. No.: 15/207,217

(22) Filed: Jul. 11, 2016

(65) Prior Publication Data

US 2018/0013791 A1 Jan. 11, 2018

(51) Int. Cl.
| | | |
|---|---|---|
| *G06F 17/00* | (2019.01) | |
| *H04L 29/06* | (2006.01) | |
| *H04L 29/08* | (2006.01) | |
| *H04L 9/32* | (2006.01) | |

(52) U.S. Cl.
CPC ............ *H04L 63/20* (2013.01); *H04L 9/3247* (2013.01); *H04L 63/0218* (2013.01); *H04L 67/16* (2013.01)

(58) Field of Classification Search
None
See application file for complete search history.

(56) References Cited

U.S. PATENT DOCUMENTS

| | | | | |
|---|---|---|---|---|
| 7,448,067 | B2* | 11/2008 | Yadav | H04L 63/0227 709/223 |
| 8,261,317 | B2* | 9/2012 | Litvin | H04L 63/0263 370/230 |
| 8,589,870 | B2* | 11/2013 | Ogilvie | G06F 8/34 717/109 |
| 9,560,015 | B1* | 1/2017 | Glazemakers | H04L 63/0263 |
| 2007/0192823 | A1* | 8/2007 | Andersen | H04L 41/0893 726/1 |

(Continued)

*Primary Examiner* — Jeffrey Nickerson
*Assistant Examiner* — Vadim Savenkov
(74) *Attorney, Agent, or Firm* — Womble Bond Dickinson (US) LLP

(57) ABSTRACT

In embodiments, methods and systems for implementing configuration management are provided. A configuration management system facilitates processing and preserving configurations associated with a software infrastructure. The software infrastructure operates as a co-located environment, high availability environment, disaster recovery environment or migration environment. The configuration management system specifically maintains implementation of firewall configurations for a source computing environment and a destination computing environment. The source computing environment communicates with the destination computing environment using a communication channel via an untrusted network. The configuration management system includes a leader component that accesses the firewall configurations, from the source computing environment, transforms the firewall configurations to a transformed version and communicates the transformed version to the destination computing environment. The configuration management system also includes a follower component that accesses and restores the transformed version into a restored version of the firewall configurations and implements the restored version at the destination computing environment.

20 Claims, 6 Drawing Sheets

(56) References Cited

U.S. PATENT DOCUMENTS

| | | | | |
|---|---|---|---|---|
| 2008/0066150 | A1* | 3/2008 | Lim | G06F 17/3089 |
| | | | | 726/1 |
| 2009/0077621 | A1* | 3/2009 | Lang | H04L 63/0263 |
| | | | | 726/1 |
| 2010/0095348 | A1* | 4/2010 | Foster | G06F 21/6236 |
| | | | | 726/1 |
| 2011/0302647 | A1* | 12/2011 | Bhattacharya | H04L 63/0263 |
| | | | | 726/11 |
| 2014/0359693 | A1* | 12/2014 | Lemke | H04L 63/0263 |
| | | | | 726/1 |
| 2015/0358283 | A1* | 12/2015 | Halabi | H04L 63/0227 |
| | | | | 726/1 |
| 2016/0149863 | A1* | 5/2016 | Walker | G06F 21/00 |
| | | | | 726/1 |
| 2016/0344743 | A1* | 11/2016 | Dotan | H04L 63/108 |
| 2017/0005986 | A1* | 1/2017 | Bansal | H04L 63/0263 |
| 2017/0005987 | A1* | 1/2017 | Masurekar | G06F 16/25 |
| 2018/0109903 | A1* | 4/2018 | Tegegne | H04W 4/50 |

* cited by examiner

METHODS AND SYSTEMS FOR PROVIDING CONFIGURATION MANAGEMENT FOR COMPUTING ENVIRONMENTS

BACKGROUND

Computing environments operate based on software infrastructure such as software components, data, and configurations associated with the computing environments. Different instances or portions of computing environments can communicate with each other to support computing tasks. Computing environments communicate in various configurations. For example, software migration can include moving software infrastructure from one computing environment to another, where a source computing environment communicates with a destination computing environment during the migration. Software migration may be implemented to improve on a computing environment to provide better performance and features or switching the operating environment region or provider.

SUMMARY

Embodiments described herein provide methods and systems for implementing configuration management for computing environments. Configuration management includes processing and preserving configurations of computing environments. Computing environments can include a software infrastructure (e.g., software components, data and configurations). Configuration management, by way of example, can be implemented during software migration, when portions of a software infrastructure are relocated to a different computing environment. Configuration management supports maintaining the implementation of the configurations when operating a source computing environment and a destination computing environment. For example, firewall configurations for the computing environments may be maintained and not circumvented for traffic routed between the computing environments. In particular, when migrating a software infrastructure, firewall configurations of the software infrastructure may operate based on a logical deployment of the source computing environment; however using components of a configuration management system, the implementation of the firewall configurations is maintained during migration outside of the logical deployment, via an untrusted network (e.g., a public network).

In operation, the configuration management system supports maintaining configurations associated with different computing environments or portions of the same computing environment that operate together. By way of example, in certain embodiments configuration management can be implemented for the migration of a software infrastructure from the source computing environment to the destination computing environment via the untrusted network. The configuration management system includes a leader component that accesses firewall configurations from the source computing environment, transforms the firewall configurations to a transformed version, and communicates the transformed version to the destination computing environment. The configuration management system also includes a follower component that accesses and restores the transformed version into a restored version of the firewall configurations and implements the restored version at the destination computing environment as a utility-defined firewall configuration. The firewall configurations implementation at the source computing environment is performed using a centralized mode and the firewall configurations implementation at the destination computing environments is performed using a distributed implementation mode.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Embodiments are described in detail below with reference to the attached drawing figures, wherein.

DETAILED DESCRIPTION

Figure 1:
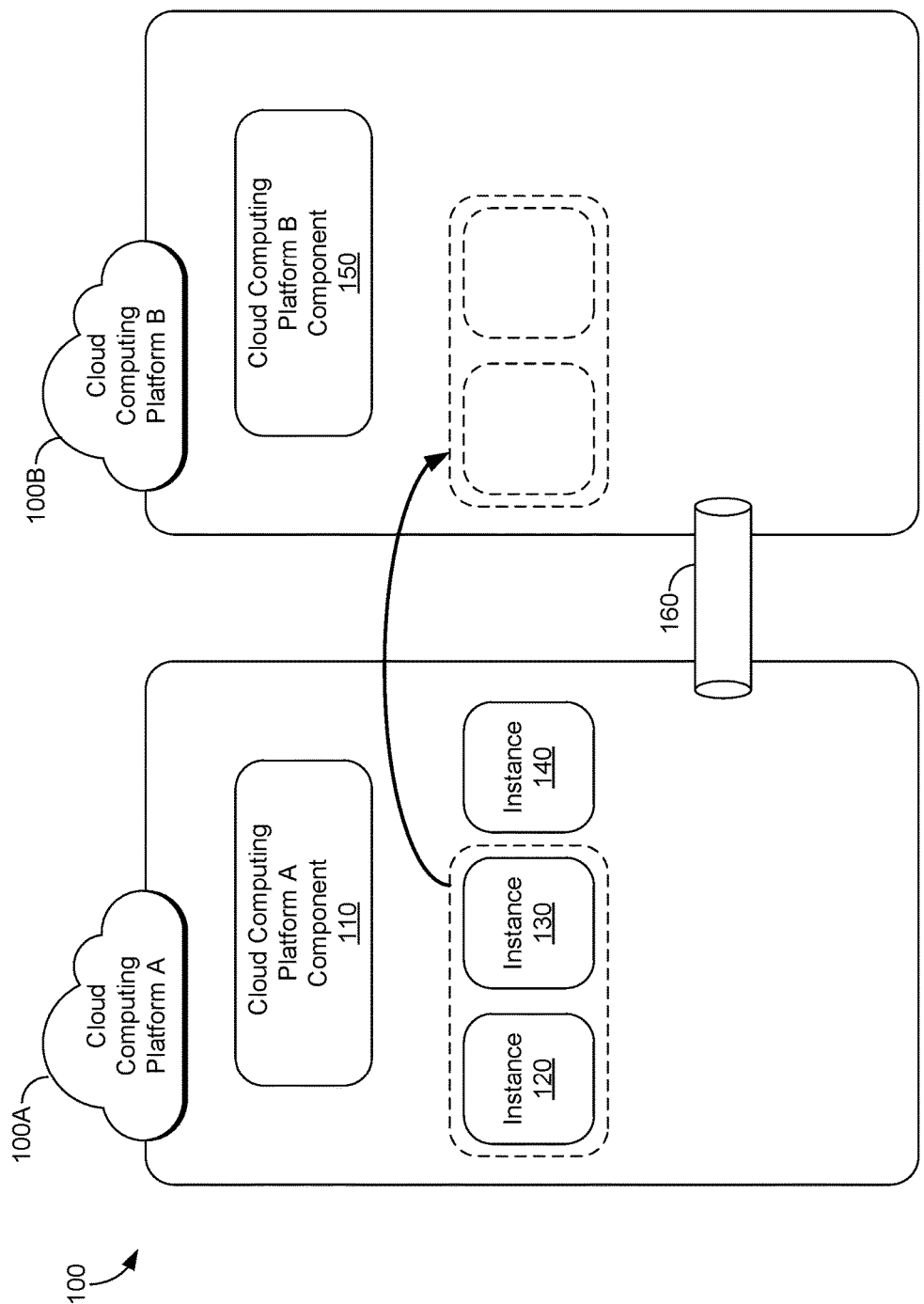
FIG. 1 is a block diagram of an exemplary distributed computing environment in which embodiments described herein may be employed.

Embodiments described herein provide simple and efficient methods and systems for implementing configuration management. Configuration management facilitates, for a source computing environment and a destination computing environment, processing and preserving firewall configurations of their corresponding software infrastructure. The configuration management system is implemented in software infrastructure that operates in a variety of implementations including: a co-located deployment, high availability, disaster recovery, and migration. In operation, the configuration management system accesses firewall configurations from the source computing environment and communicates the firewall configurations for implementation in the destination computing environment. The configuration management system includes a leader component and one or more follower components that facilitate processing and preserving the firewall configurations. The leader component can also be implemented on a number of nodes to provide high availability.

The leader component accesses the firewall configurations, where the firewall configurations include elements that control traffic between software components (e.g., instances) in the source computing environment. The leader component performs configuration preservation operations that include transforming the firewall configurations from a source format into an intermediate format. The configuration preservation operations can also include serializing and digitally signing the firewall configurations in the intermediate format. The leader component communicates a transformed version of the firewall configurations in the intermediate format to the destination computing environment to cause implementation of the firewall configurations at the destination computing component. The leader component can automatically periodically access the firewall configurations and transform and communicate the transformed version of the firewall configurations. A portion of software components (e.g., instances) in the destination computing environment operates with another portion of the software components that are in source computing environment. The software components in the destination computing environment and the software components in the source computing environment communicate using a communication tunnel (e.g., IPsec tunnel) to communicate via an untrusted network.

The configuration management system includes the follower component to support operations on the destination computing environment. The follower component performs configuration restoration operations that include accessing and authenticating the transformed version of the firewall configurations and then generating and deploying a restored version of the firewall configurations in a destination format. The restored version in the destination format can be a firewall configuration based on a firewall rules utility. The firewall rules utility can help define a firewall configuration based on ipset definitions and iptables rules or packet filtering rules. The follower component can also automatically periodically access the transformed version of the firewall configurations and generate the restored version of the firewall configurations. The follower component may be installed on a corresponding software component (e.g., an instance), such that, the follower component deploys the restored version of the firewall configuration to be implemented (e.g., apply and execute) on the corresponding software component. The firewall configurations implementation at the source computing environment may operate utilizing a centralized mode (e.g., provider level implementation) and the firewall configurations implementation at the destination computing environments may operate utilizing a distributed mode (e.g., host level implementation). In this regard, implementation of the firewall configurations is maintained when operating between the computing environments.

By way of example, for further illustration of embodiments described herein, a source computing environment has firewall configurations (e.g., security groups) that control traffic routed between software components in the source computing environment and the destination computing environment. A security group can operate as a virtual firewall. Security groups can be associated with security group configurations that include the specific settings (e.g., configurable elements) that are functional attributes of security groups. For example, a security group can include a plurality of rules that can be added, removed, or modified to control traffic to software components (e.g., instances). Security group configurations can be implemented on software components, in that, the configurations are applied to the software component and the software component is executed based on the security group configurations. Security group configurations vary for different types of software components and corresponding computing environments. In particular, configurations are related to how the software component works or operates internally and externally in relation to the computing environment. Security groups may be configured and accessed based on user interfaces and Application Programming Interfaces supported in the computing environment.

Software components in a computing environment can refer to instances that are compute units that are associated with software and/or hardware configurations for performing operations in the computing environment. In one example, an instance may be a virtual machine that emulates a computing system. Software infrastructure, including software components, can be migrated from a source computing environment to a destination computing environment for several different reasons including improving the computing environment for better performance and features or switching the operating environment region or provider. Software migration of a software infrastructure can be performed on different types of computing environments that may operate within a network. Software migration can specifically include moving from one cloud computing platform (e.g., a public cloud) to another cloud computing platform (e.g., a virtual private cloud). Software migration can also include migrating to the same type of cloud computing platform, but to another regional implementation of the cloud computing platform (e.g., moving from a North East Region to a South West Region).

Configuration management includes processing and preserving configurations of a source computing environment and a destination computing environment. The source computing environment and destination computing environments can operate as co-located environments, high availability environments, disaster recovery environments or migration environments. Several reasons can exist for preserving configurations, for example, configuration can be quite tedious to initially define and it would take significant effort to re-define the configuration in a new environment. If new configurations are to be defined, there may be delays and errors during this process that can compromise the operating environments. As such, preserving configurations facilitate the continuity and predictability of software operations in a computing environment.

Migration between computing environments can be performed via an untrusted network (e.g., a public network) using a communication channel configured between the source computing environment and the destination computing environment. The communication channel can be the public internet or an IPsec tunnel. In particular, an IPsec tunnel can support encryption of the software infrastructure communicated via the untrusted network from the source computing environment to the destination computing environment. When migration from the source computing environment to the destination computing environment is performed in a sequential manner, only portions of software components are being migrated at a time. The communication channel supports communication between software components in the source computing environment and the destination computing environment during migration; however it may not support traffic controls as defined in the firewall configurations. At a high level, traffic controls are not implemented via the communication channel because firewall configurations operate based on logical deployments. For example, a computing environment running as an Elastic Compute Cloud (e.g., AMAZON EC2) or Virtual Private Cloud (e.g., AMAZON VPC). Communication of the software infrastructure (e.g., software components, configurations, and data) outside of the logical deployment disables implementation of firewall configurations during migration. For example, endpoints associated with a communication tunnel can access software components in the destination computing environment without regard for firewall configurations associated with packets traversing the communication tunnel. Implementing firewall configurations is consistent with modern multitenant computing environment design. Modern computing environments are designed around practices that dictate a principle of least privilege, in other words, firewall configurations are implemented such that software components communicate in an as-needed basis. As such, not all software components communicate with each other. Firewall configurations for traffic routing between software components in a migration software infrastructure can thus implemented and maintained using the configuration management system.

The configuration management system described herein can access, transform, secure and communicate the firewall configurations from the source computing environment. The configuration management system can also access, authenticate, deploy and cause implementation the firewall configurations on the destination computing environment as a firewall configuration. Further, the firewall configurations are implemented at a computing environment provider level (i.e., centralized mode) at the source computing environment and implemented at a host level (i.e., distributed mode) in the destination computing environment. As such, during migration, the configuration management system maintains implementation of the firewall configurations of the software components when communicating between the source computing environment and the destination computing environment.

For purposes of a detailed discussion below, embodiments are described with reference to distributed computing devices, components, and a source and destination cloud computing environments or platforms implementing a configuration management system. Components can be configured to perform novel aspects of embodiments described herein, where "configured to" includes components that are programmed to perform particular tasks or implement particular abstract data types using computer code. It is contemplated that the methods described herein can be performed in different types of operating environments having alternate configurations of the functional components described herein. As such, the embodiments described herein are merely exemplary, and it is contemplated that the techniques may be extended to other implementation contexts.

Figure 2:
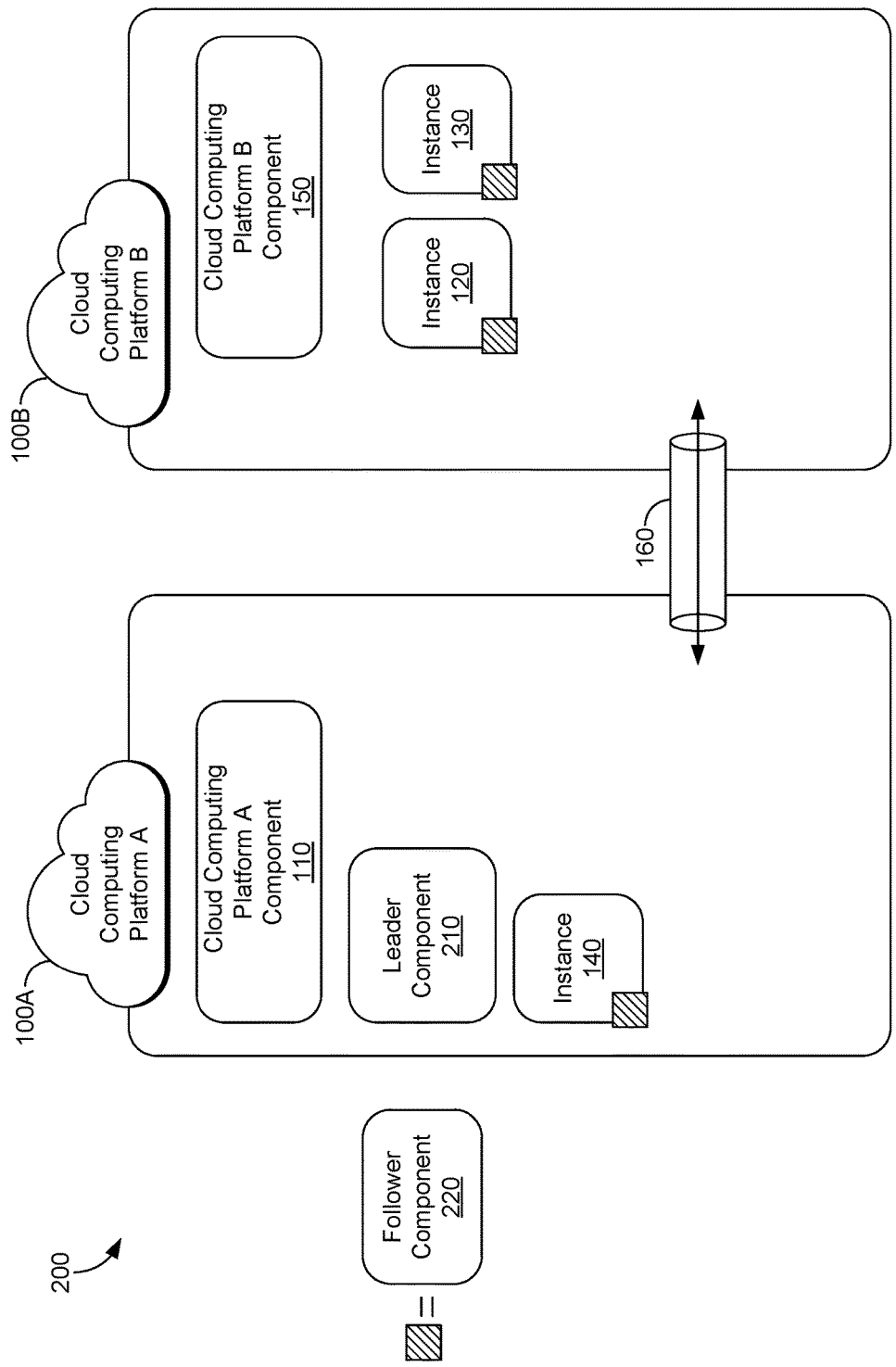
FIG. 2 is a block diagram of an exemplary distributed computing environment in which embodiments described herein may be employed.
Figure 3:
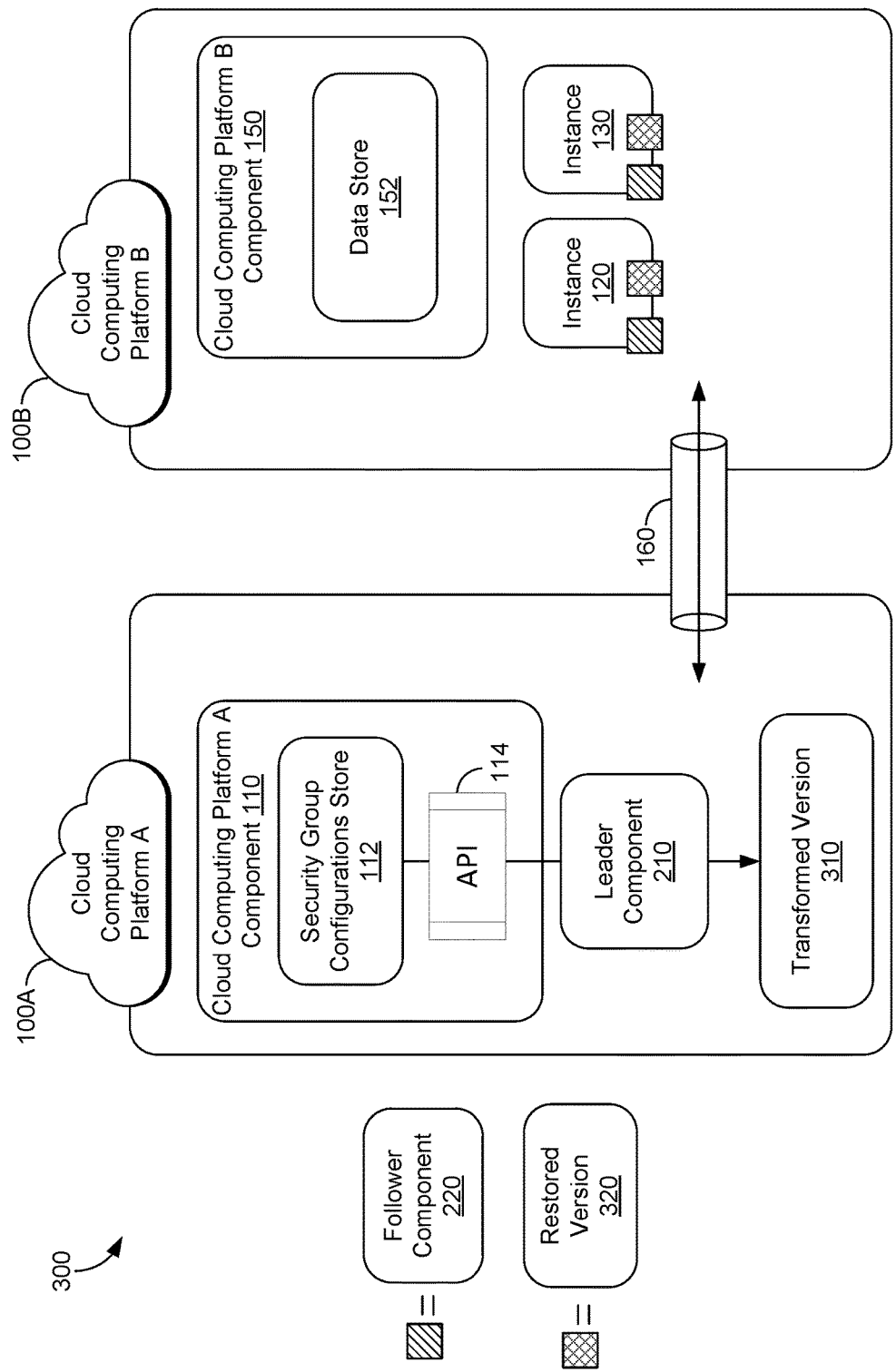
FIG. 3 is a block diagram of an exemplary distributed computing environment in which embodiments described herein may be employed.

With initial reference to FIGS. 1-3, FIG. 1 illustrates an exemplary distributed computing environment 100 for implementing a configuration management system. In particular, FIG. 1 shows a high level architecture of the distributed computing environment 100 having a cloud computing platform A 100A that includes a cloud computing platform component A 110, instance 120, instance 130 and instance 140. FIG. 1 illustrates components of the cloud computing platform A 100A and also components of the cloud computing platform B 100B having cloud computing platform B component 150. A communication tunnel 160 (e.g., IP tunnel, IPsec tunnel) can be configured for communications between the cloud computing platform A 100A and the cloud computing platform B 100B over an untrusted network. A "first portion" of software components (i.e., instance 120 and instance 130) of the cloud computing platform A 100A are designated as a first portion to be migrated to the cloud computing platform B 100B.

FIG. 2 illustrates a distributed computing environment 200 that includes components of the cloud computing platform A 100A and also components of the cloud computing platform B 100B. In particular, instance 120 and instance 130, the "first portion" of software components, have been migrated from cloud computing platform A 100A to cloud computing platform B 100B. The "second portion" of software components of the cloud computing platform A 100A are designated as a second portion of software components. The second portion of software components can communicate with the software components of the cloud computing platform B 100B via the communication channel 160. The distributed computing environment 200 further includes the configuration management system to support migration functionality disclosed herein. The configuration management system includes a leader component 210 and a follower component 220 (of a plurality of follower components). The configuration management system can be implemented to support maintaining configurations between the cloud computing platform A 100A and cloud computing platform B 100B.

A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various components of the distributed computing environments, it is noted that any number of components may be employed to achieve the desired functionality within the scope of the present disclosure. The various components of FIGS. 1-3 are shown with lines for the sake of clarity. Further, although some components of FIGS. 1-3 are depicted as single components, the depictions are exemplary in nature and in number and are not to be construed as limiting for all implementations of the present disclosure. The configuration management system functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

By way of background, one or more data centers can support the distributed computing environments described in FIGS. 1-3 that includes the cloud computing platform A 100A, cloud computing platform B 100B and various physical racks and nodes (e.g., computing devices, processing units, or blades) in rack. Cloud computing platform A 100A and cloud computing platform B 100B can be located in geographically distributed locations. The configuration management system can be implemented in cloud computing platform A 100A and cloud computing platform B 100B that run cloud services across different data centers and geographic regions. The cloud computing platform A 100A and cloud computing platform B 110B can implement corresponding cloud computing platform components (e.g., cloud computing platform A component 110 and cloud computing platform B component 150) for provisioning and managing resource allocation, deployment, upgrade, routing, security group configurations, and management of cloud services. Typically, the cloud computing platform A component 110 and cloud computing platform B component 150 act to store data or run service applications in a distributed manner. The cloud computing platform A 100A and cloud computing platform B 100B in corresponding data centers can be configured to host and support operation of endpoints of a particular service application. The cloud computing platform A 100A and cloud computing platform B 100B may be public clouds, private clouds (e.g., virtual private clouds), or dedicated clouds. Other variations and combinations of clouds are contemplated with embodiments described herein.

A node can be provisioned with a cloud computing platform component to run on a host (e.g., operating system or runtime environment—not shown) running a defined software stack on the node. A node can also be configured to perform specialized functionality (e.g., compute nodes or storage nodes) within the cloud computing platform. A node implements software components (e.g., instance 120, instance 130 or instance 140) that operate with each other to process data. The node is allocated to run one or more portions of a service application of a user. A user can refer to a customer utilizing resources of the cloud computing platform. Service application components of the cloud computing platform A 100A and cloud computing platform B 100B can be dedicated to support a particular user. The terms service application, application, or service are used interchangeably herein and broadly refer to any software, or portions of software, that run on top of, or access storage and compute device locations within, a datacenter.

When more than one separate service application is being supported by the node 130, the node may be partitioned into virtual machines. Physical machines can also concurrently run separate service applications. The virtual machines or physical machines can be configured as individualized computing environments that are supported by resources (e.g., hardware resources and software resources) in the cloud computing platform A 100A and cloud computing platform B 100B. It is contemplated that resources can be configured for specific service applications. Further, each service application may be divided into functional portions such that each functional portion is able to run on a separate virtual machine. In the cloud computing platform A 100A and cloud computing platform B 100B, multiple servers may be used to run service applications and perform data storage operations in a cluster. In particular, the servers may perform data operations independently but exposed as a single device referred to as a cluster. Each server in the cluster can be implemented as a node.

A client device may access a service application in the cloud computing platform A 100A and cloud computing platform B 100B. The client device may be any type of computing device, which may correspond to computing device 700 described with reference to FIG. 7, for example. The client device can be configured to issue commands to cloud computing platform A 100A and cloud computing platform B 100B. In embodiments, client device may communicate with service applications through a virtual Internet Protocol (IP) and load balancer or other means that directs communication requests to designated endpoints in the cloud computing platform A 100A and cloud computing platform B 100B. The components of cloud computing platforms may communicate with each other over a network (not shown), which may include, without limitation, one or more local area networks (LANs) and/or wide area networks (WANs).

With continued reference to FIG. 2, FIG. 2 illustrates the configuration management system having a plurality of components responsible for facilitating software migration from the cloud computing platform A 100A to the cloud computing platform B 100B. The leader component 210 supports accessing, transforming, securing and communicating and implementing configurations (e.g., firewall configurations) from the cloud computing platform A 100A to the cloud computing platform B 100B. The leader component 210 accesses the firewall configurations from the cloud computing platform A component 110.

With reference to FIG. 3, the cloud computing platform A component 110 can support routing fabric function in the cloud computing platform A 100A. The cloud computing platform A component 110 receives, stores and implements firewall configurations for the cloud computing platform A 100A. The cloud computing platform A component 110 can receive the configurations from a user configuring software components in the cloud computing platform A 100A. The cloud computing platform A component 110 can store the firewall configurations in a firewall configurations store 112. The firewall configurations may be stored in a source format (e.g., security groups) for provider level implementation on the cloud computing platform A 100A. The cloud computing platform A component 110 can implement the firewall configurations having configuration elements that determine how the firewall configurations are implemented. The cloud computing platform A component 110 can include Application Program Interfaces (APIs) (e.g., API 114) that can be used to access the configuration elements of firewall configurations. Firewall configurations can include inbound or outbound rules configurations and further include several additional configuration elements including source IP, protocol, port range, group names, instances, and descriptions, amongst other configuration elements. Firewall configurations can be associated with specific software components (e.g., instances) that are identified and maintained upon migration of the software components. For example, the leader component 210 can query the API 114 to determine firewall configurations associated with particular instances which are migrated from the cloud computing platform A 100A to cloud computing platform B 100B. As such, the leader component 210 communicates with the cloud computing platform A component 110 to access the firewall configurations.

The leader component 210 processes the firewall configurations based on configuration preservation operations. The leader component 210 initiates and performs configuration preservation operations. The leader component 210 transforms and secures the firewall configurations. The leader component 210 transforms the firewall configurations from a source format into an intermediate format. Transforming the firewall configurations can include serializing or translating the firewall configurations into the intermediate format. A format of the firewall configurations refers to conventions, rules and standards that define the syntax and semantics for implementation. For example, the source format of the firewall configurations allows the firewall configurations be implemented in the cloud computing platform A 100A. In particular, the firewall configurations can be implemented using the cloud computing platform A component 110 that supports a provider level implementation of the firewall configurations. The provider level can refer to a centralized mode where a central component applies and executes the firewall configurations (e.g., security groups) for a plurality of software components in a computing environment.

Figure 4:
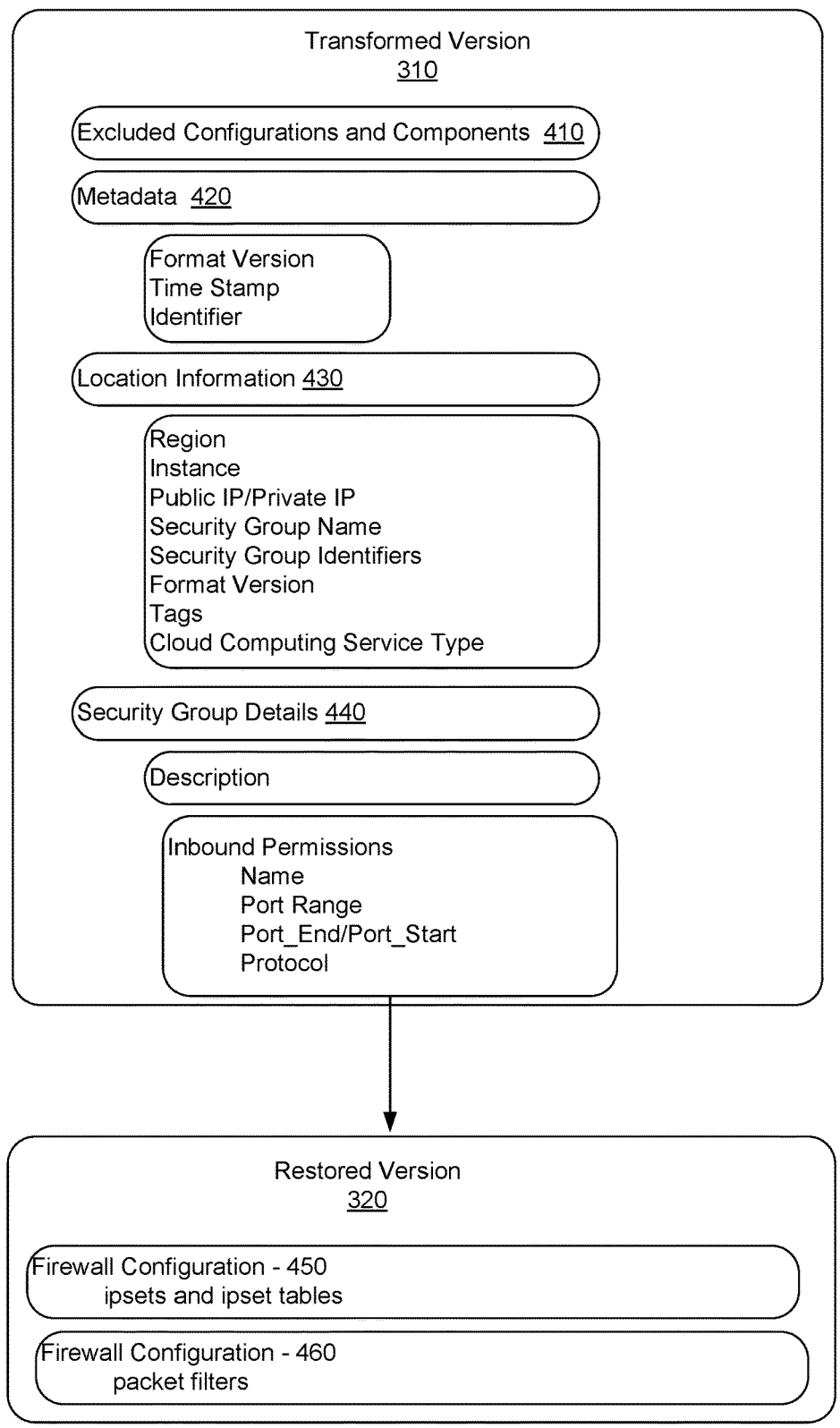
FIG. 4 is a schematic of exemplary firewall configurations as a transformed version and a restored version, in accordance with embodiments described herein.

With reference to FIG. 4, an exemplary transformed version 310 of firewall configurations is illustrated. The transformed version 310 can include the firewall configurations in the intermediate format. The intermediate format may be an intermediary representation of the firewall configurations, where the representation includes configuration elements of the firewall configurations (e.g., IP ranges, instances, computing environments, identifiers, etc.) and metadata about the firewall configurations and the transformation process (e.g., timestamp, identifiers, version). The intermediate format can be transformed to a destination format at the cloud computing platform B 100B. The destination format refers a format associated with a restored version of the firewall configurations that allow the firewall configurations to be implemented in the cloud computing platform B 100B. In particular, the firewall configurations restored at the cloud computing platform B 100B can be implemented using a host level implementation of the firewall configurations. The host level can refer to a distributed mode where a firewall rules utility is utilized to apply and execute the firewall configurations for the software components (e.g., instances or nodes) in a computing environment. The intermediate format and destination format of the firewall configurations also (i.e., the transformed version and restored version), allows the firewall configurations to be processed using configuration restoration operations at the follower component 220, as discussed herein below in more detail.

The transformed version 310 can be defined in human-readable text format as a data object. The data object includes attribute-value pairs that identify source format configuration elements in the destination format. The data object representation can be in a language-independent format. The attribute-value pairs can represent several different configuration elements including excluded configurations and components 410, metadata 420, location information 430, and security group details 440. Other variations and combinations of a destination format for representing security groups and configuration elements are contemplated in embodiments described here.

The configuration preservation operations further include defining the firewall configurations at least in part in a manifest and digitally signing the transformed version of the firewall configurations. The transformed version 310 of the firewall configurations in the intermediate format can include files as a package and the associated manifest file. The manifest may identify the files in the package and enumerate the files which are included in the package for implementing the firewall configurations at the cloud computing platform B 100B. The manifest may optionally contain a cryptographic hash or checksum of each file. By creating a cryptographic signature for such a manifest file, the entire contents of the package can be validated for authenticity and integrity, as altering any of the files will invalidate the checksums in the manifest file.

With reference to FIG. 3, in the distributed computing environment 300, the leader component 210 further communicates the transformed version 310 of the firewall configurations in the intermediate format. The leader component 210 can communicate the transformed version 310 to the cloud computing platform B 100B in several ways. The transformed version 310 can be communicated to the data store 152 associated with the cloud computing platform B 100B. For example, a secure and durable data store may accessed (e.g., via a web service interface) to communicate the transformed version 310 of the firewall configurations. The leader component 210 can be configured to periodically access transform and communicate the firewall configurations of the cloud computing platform A 100A such that any changes to the firewall configurations in the cloud computing platform A 100A are timely updated in the cloud computing platform B 100B. The cloud computing platform B component 150 can retrieve the transformed version 310 of the firewall configurations and facilitate implementing the firewall configurations in the cloud computing platform B 100B. The follower component 220 on the software component could receive or fetch the transformed version 310. Other variations and combinations of methods for communicating the firewall configurations are contemplated herein.

The configuration management system further includes the follower component 220 that operates as an agent to support accessing, restoring/transforming and implementing the firewall configurations (e.g., restored version 320 of the firewall configurations in destination format) in the cloud computing platform B 100B. The cloud computing platform B component 150 can also support routing fabric function in the cloud computing platform B 100B. The cloud computing platform B component 150 receives, stores and implements firewall configurations associated with cloud computing platform B 100B. The firewall configurations native to the cloud computing platform B 100B may be, in some embodiments, operationally implemented differently from the transformed versions in the destination format. For example, the cloud computing platform B component 150 can receive the firewall configurations from a user configuring software components in the cloud computing platform B 100B for native implementation. The cloud computing platform B component 150 can support a data store 152 for transformed versions of the firewall configurations to be stored, restored/transformed retrieved and implemented on software components. As used herein, implementing includes applying and executing the firewall configurations or applying the firewall configurations in the destination format to the software component associated with the firewall configurations such that the software component is operated based on the firewall configurations.

The follower component 220 can be configured to initiate and perform configuration restoration operations. The follower component 220 can be a software service that is installed on the instances (e.g., application instances, database instances, service instances) in the distributed computing environment. In this regard, each instance may include a corresponding follower component that support implementing the firewall configurations in the destination format at the host level. The follower component 220 accesses the transformed version 310 of the firewall configurations. The follower component 220 may further authenticate the firewall configurations based on the manifest containing a cryptographic hash or checksum of each file. The digital signature or cryptographic signature of the manifest is used to validate and authenticate the integrity of the entire contents of the package, as altering any of the files will invalidate the checksums in the manifest file.

With reference to FIG. 4, the follower component 220 further operates to generate a restored version 320 (destination format) of the firewall configurations from the transformed version 310 (intermediate format) of the firewall configurations. The transformed version 310 in the intermediate format defines the firewall configurations based on the conventions, rules and standards that define the syntax and semantics for converting the transformed version 310 to the restored version 320 in the destination format. In this regard, follower component 220 is able to implement firewall configurations based on the destination format.

Generating the restored version 320 in particular includes converting configuration elements of the transformed version 310 into a firewall configuration in the destination format based on a firewall rules utility. A firewall configuration (e.g., firewall configuration 450 or firewall configuration 460) can refer to security rules for monitoring and controlling incoming and outgoing traffic. The firewall configuration serves to filter traffic to a corresponding software component associated with the firewall configuration. In one exemplary embodiment, the firewall configuration is implemented based on ipset definitions and iptable rules. The ipset definitions and iptable rules are part of a framework administered by an ipset utility for storing IP addresses, port numbers IP and MAC address pairs and defining rules using iptables. In another exemplary implementation, the firewall configuration is implemented based on packet filters for filtering TCP/IP traffic and doing Network Address Translation. Packet filers are also capable of normalizing and conditioning TCP/IP traffic. Other variations and combinations of firewall rules utilities are contemplated with embodiments described herein.

The follower component 220 can deploy the restored version 320 of the firewall configurations to the software components in the cloud computing platform B 100B. Software components (e.g., an instance) can include corresponding follower components that deploy the firewall configurations. Implementing the firewall configurations is based on the firewall configuration of the restored version 320 derived from the transformed version 310. As such, during migration, a first portion of the software components on the destination cloud computing platform and the second portion of the software components on the source cloud computing platform communicate via a communication channel while simultaneously implementing the firewall configurations on the source computing environment and the restored version of the firewall configurations on the destination computing environment.

Figure 5:
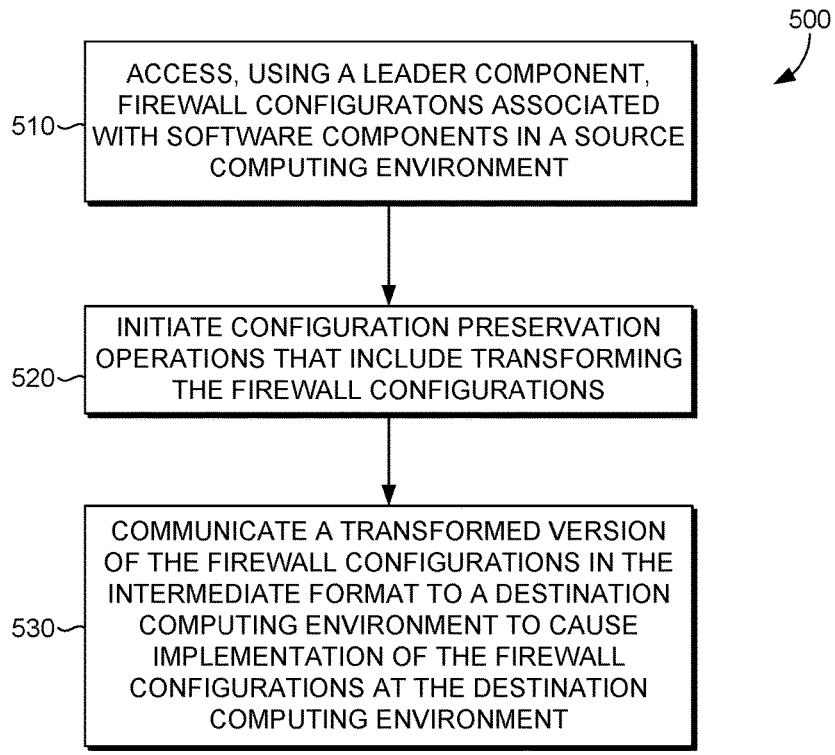
FIG. 5 is a flow diagram showing an exemplary method for providing configuration management, in accordance with embodiments described herein.

Turning now to FIG. 5, a flow diagram is provided that illustrates a method 500 for implementing configuration management. Initially at step 510, using a leader component, firewall configurations associated with software components in a source computing environment are accessed. The firewall configurations have configuration elements that control traffic between software components in the source cloud computing platform. The leader component accesses, via an Application Programming Interface (API), the firewall configurations from a source computing environment component. The leader component can also access the firewall configurations directly as other data structure representations (e.g., a file or a database). The source computing component implements the firewall configurations on a logical deployment of the source computing environment at the provider level.

At block 520, configuration preservation operations, that include transforming the firewall configurations from a source format to an intermediate format associated with a destination format, are initiated. The intermediate format is associated with a destination format. The destination format supports implementing the firewall configurations based on configuration restoration operations and a restored version of the firewall configurations in the destination format. The configuration preservation operations can include serializing the firewall configurations into the intermediate format such that a follower component performs the configuration restoration operations to transform the intermediate format to the destination format. The configuration preservation operations can also include digitally signing the firewall configurations with the manifest comprising metadata of the firewall configurations. The digitally signed firewall configurations and corresponding metadata facilitate authenticating the transformed version of the firewall configurations at the destination computing environment.

At block 530, a transformed version of the firewall configurations in the intermediate format is communicated to a destination computing environment. The transformed version is communicated to cause implementation of the firewall configurations based on the configuration restoration operations and the restored version of the firewall configuration in the destination format. The configuration restoration operations facilitate maintaining implementation of the firewall configurations in the source computing environment and the destination computing environment during migration. The restored version of the firewall configurations is a firewall configuration based on a firewall rules utility (e.g., ipset definitions and iptable rules or packet filter rules) that is implemented on a corresponding software component of the follower component.

A first portion of software components are in the destination computing environment operate with a second portion of the software components on the source computing environment, where corresponding follower components are installed on the software components in the destination computing environment. The first portion of the software components on the destination computing environment and the second portion of the software components on the source computing environment communicate using a communication channel while simultaneously implementing the firewall configurations on the source computing environment and the restored version of the firewall configurations on the destination computing environment.

Figure 6:
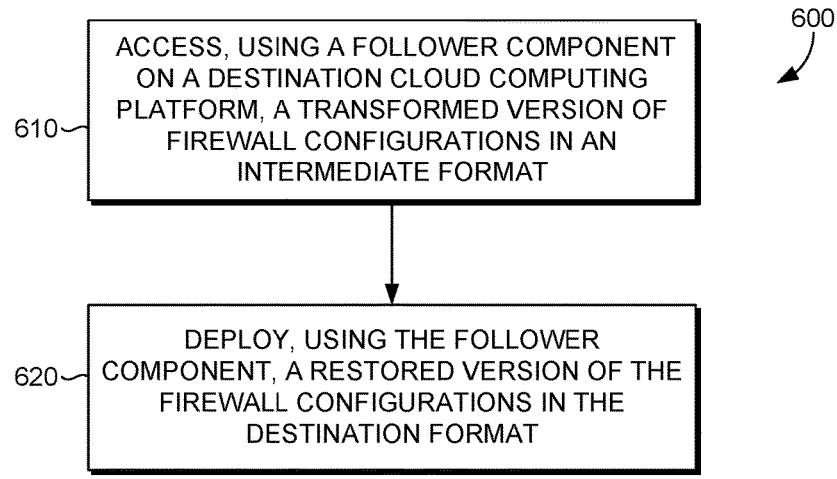
FIG. 6 is a flow diagram showing an exemplary method for providing configuration management, in accordance with embodiments described herein.

Turning now to FIG. 6, a flow diagram that illustrates a method 600 for implementing configuration management. Initially at block 610, using a follower component on a destination cloud computing platform, a transformed version of firewall configurations is accessed. The transformed version of the firewall configurations is transformed from firewall configurations in a source format to an intermediate format associated with a destination format.

At block 620, using the follower component, the transformed version is restored or transformed into a restored version in a destination format. The restored version of the firewall configurations in the destination format is generated based on the transformed version of the firewall configurations. Accessing and deploying are part of configuration restoration operations that facilitate maintaining implementation of the firewall configurations in software components of the source cloud computing platform and the destination cloud computing platform. The configuration restoration operations further include authenticating the transformed version of the firewall configurations.

With reference to the configuration management system, embodiments described herein can improve software migration using the configuration management system. The configuration management system components refer to integrated components that implement configuration management services. The integrated components refer to the hardware architecture and software framework that support functionality using the configuration management system. The hardware architecture refers to physical components and interrelationships thereof and the software framework refers to software providing functionality that can be implemented with hardware operated on a device. The end-to-end software-based configuration management system can operate within the platform components to operate computer hardware to provide platform functionality. As such, the configuration management system components can manage resources and provide services for the configuration management system functionality. Any other variations and combinations thereof are contemplated with embodiments described herein.

By way of example, the configuration management system can include an API library that includes specifications for routines, data structures, object classes, and variables may support the interaction the hardware architecture of the device and the software framework of the configuration management system. These APIs include configuration specifications for the configuration management system such that the components therein can communicate with each other in the configuration management system, as described herein.

Figure 7:
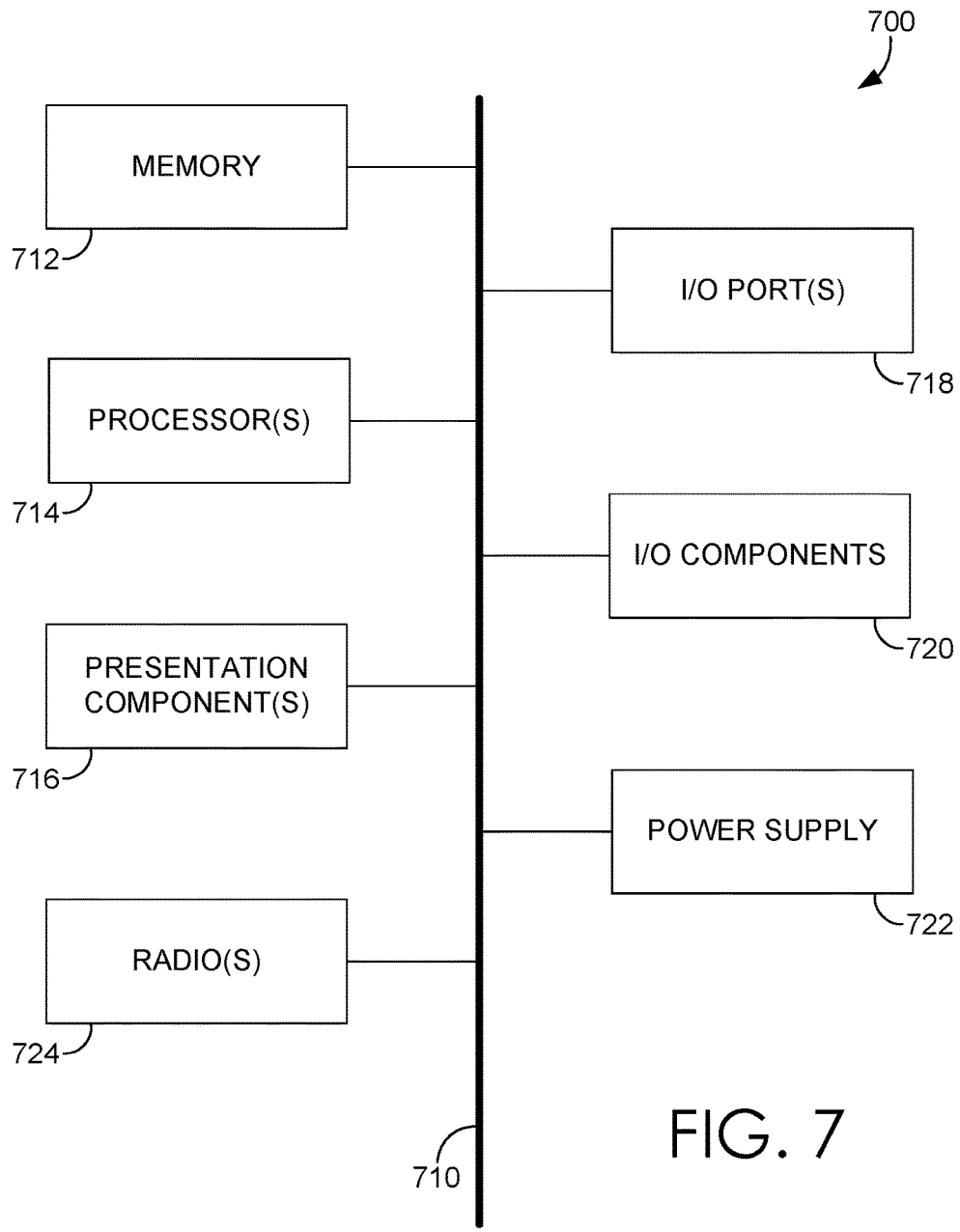
FIG. 7 is a block diagram of an exemplary computing environment suitable for use in implementing embodiments described herein.

Having described embodiments of the present disclosure, an exemplary operating environment in which embodiments of the present disclosure may be implemented is described below in order to provide a general context for various aspects of the present disclosure. Referring initially to FIG. 7 in particular, an exemplary operating environment for implementing embodiments of the present disclosure is shown and designated generally as computing device 700. Computing device 700 is but one example of a suitable computing environment and is not intended to suggest any limitation as to the scope of use or functionality of the disclosure. Neither should the computing device 700 be interpreted as having any dependency or requirement relating to any one or combination of components illustrated.

The embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The embodiments may be practiced in a variety of system configurations, including hand-held devices, consumer electronics, general-purpose computers, more specialty computing devices, etc. The embodiments may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" involves "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing configuration management, the system comprising:
a memory of a source cloud computing platform that stores firewall configurations; and
a processor coupled with the memory configured to execute a leader component to cause the processor to:
access firewall configurations associated with a software infrastructure in a source cloud computing platform, the firewall configurations having configuration elements that control traffic between software components in the source cloud computing platform when enforced by the source cloud computing platform,
in response to migration of a portion of software components from the source cloud computing platform to a destination cloud computing platform, initiate configuration preservation operations that include the source cloud computing platform transforming the firewall configurations from a source format into an intermediate format that is language independent, the intermediate format comprising the firewall configurations defined in part as a manifest for implementing the firewall configurations for the portion of software components at the destination cloud computing platform, and
communicate a transformed version of the firewall configurations, in the intermediate format, to the destination cloud computing platform to cause implementation of the firewall configurations based on configuration restoration operations performed by the destination cloud computing platform that generate a restored version of the firewall configurations in a format of the destination cloud computing platform, wherein configuration restoration operations are performed by a follower component, executed by a processor of the destination cloud computing platform, on the transformed version of the firewall configurations to facilitate maintaining implementation of the firewall configurations for at least communications exchanged between the software components remaining in the source cloud computing platform and the portion of software components being migrated to the destination cloud computing platform.

2. The system of claim 1, wherein the configuration preservation operations further comprise:
serializing the firewall configurations into the intermediate format.

3. The system of claim 1, wherein the configuration preservation operations further comprise:
digitally signing the firewall configurations with the manifest comprising metadata of the firewall configurations, wherein the digitally signed firewall configurations and corresponding metadata facilitate authenticating the transformed version at the destination cloud computing platform.

4. The system of claim 1, further comprising the follower component to initiate the configuration restoration operations, the configuration restoration operations comprising:
accessing the transformed version of the firewall configurations in the intermediate format;
authenticating the transformed version of the firewall configurations;
generating the restored version of the firewall configurations in the destination format; and
deploying the restored version of the firewall configurations to a corresponding software component in the destination cloud computing platform to implement the restored version.

5. The system of claim 4, wherein the restored version is a firewall configuration based on ipset definitions and iptable rules that are implemented on the corresponding software component of the follower component.

6. The system of claim 4, wherein the restored version is a firewall configuration based on packet filters that are implemented on the corresponding software component of the follower component.

7. The system of claim 1, wherein a first portion of the software components is in the destination cloud computing platform after migration and operates with a second portion of the software components on the source cloud computing platform that remain after migration, wherein the first portion of the software components operates based on a host level implementation of the firewall configurations and the second portion of the software components operates based on a provider level implementation of the firewall configurations.

8. A computer-implemented method for implementing configuration management, the method comprising:
accessing, using a processor that executes a leader component of a source cloud computing platform, firewall configurations associated with software components in a source computing environment, the firewall configurations having configuration elements that control traffic between software components in the source computing environment when enforced by the source computing environment;
in response to migration of a portion of software components from the source cloud computing platform to a destination cloud computing platform, initiating configuration preservation operations that include the source computing environs environment transforming the firewall configurations from a source format to an intermediate format that is language independent; and
communicating a transformed version of the firewall configurations in the intermediate format to the destination computing environment to cause implementation of the firewall configurations based on configuration restoration operations performed by the destination computing environment that generate a restored version of the firewall configurations of the firewall configurations in a format of the destination cloud computing platform, wherein configuration restoration operations are performed by a follower component, executed by a processor of the destination cloud computing platform, on the transformed version of the firewall configurations to facilitate maintaining implementation of the firewall configurations for at least communications exchanged between the software components remaining in the source computing environment and the portion of software components being migrated to the destination computing environment.

9. The method of claim 8, wherein the leader component accesses, via an Application Programming Interface (API), the firewall configurations from a source computing environment component, wherein the source computing component implements the firewall configurations on a logical deployment of the source computing environment.

10. The method of claim 8, wherein the configuration preservation operations further comprise:
serializing the firewall configurations into the intermediate format.

11. The method of claim 10, wherein the configuration preservation operations further comprise:
digitally signing the firewall configurations with the manifest comprising metadata of the firewall configurations, wherein the digitally signed firewall configurations and corresponding metadata facilitate authenticating the transformed version at the destination computing environment.

12. The method of claim 8, wherein the transformed version is communicated to the follower component that performs the configuration restoration operations comprising:
accessing the transformed version of the firewall configurations;
authenticating the transformed version of the firewall configurations;
generating the restored version of the firewall configurations in the destination format; and
deploying the restored version of the firewall configurations to a corresponding software component in the destination computing environment to implement the restored version of the firewall configurations.

13. The method of claim 12, wherein the restored version is a firewall configuration based on ipset definitions and iptable rules that are implemented on the corresponding software component of the follower component.

14. The method of claim 12, wherein the restored version is a firewall configuration based on packet filters that are implemented on the corresponding software component of the follower component.

15. The method of claim 8, wherein a first portion of software components is in the destination computing environment after migration and operates with a second portion of the software components on the source cloud computing platform that remain after migration, wherein the first portion of the software components operates based on a host level implementation of the firewall configurations and the second portion of the software components operates based on a provider level implementation of the firewall configurations.

16. One or more non-transitory computer storage media having computer-executable instructions embodied thereon that, when executed, by one or more processors, causes the one or more processors to perform a method for implementing configuration management, the method comprising:
accessing, using a follower component executed by the one or more processors on a destination cloud computing platform, a transformed version of firewall configurations in an intermediate format, wherein the transformed version is transformed from firewall configurations in a source format associated with a source cloud computing platform to the intermediate format, wherein the transformed version of firewall configurations is generated by the source cloud computing platform in response to migration of one or more software components from the source cloud computing platform to a destination cloud computing platform; and
deploying, using the follower component executed by the one or more processors on the destination cloud computing platform, a restored version of the firewall configurations in a destination format associated with the destination cloud computing platform, the restored version in the destination format is generated by the destination cloud computing platform based on the transformed version in the intermediate format, wherein accessing and deploying are part of configuration restoration operations that facilitate maintaining implementation of the firewall configurations for at least communications exchanged between the software components remaining in the source cloud computing platform and the one or more software components that are being migrated to the destination cloud computing platform.

17. The one or more non-transitory computer storage media of claim 16, wherein the transformed version is serialized into the intermediate format such that the follower component performs the configuration restoration operations based on the intermediate format, the intermediate format comprises the firewall configurations defined in part as a manifest.

18. The one or more non-transitory computer storage media of claim 17, wherein the transformed version is digitally signed with the manifest comprising metadata, wherein the digitally signed firewall configurations and corresponding metadata facilitate authenticating the transformed version of the firewall configurations at the destination cloud computing platform.

19. The one or more non-transitory computer storage media of claim 16, wherein the firewall configurations and the transformed version of the firewall configurations comprise configuration elements that control traffic between instances in the source cloud computing platform and the destination cloud computing platform.

20. The one or more non-transitory computer storage media of claim 16, wherein a first portion of software components on the destination cloud computing platform after migration operates with a second portion of software components on the source cloud computing platform that remain after migration, wherein the first portion of the software components operates based on a host level implementation of the firewall configurations and the second portion of the software components operates based on a provider level implementation of the firewall configurations.

* * * * *